United States Patent
Guestrin et al.

(10) Patent No.: US 11,915,460 B2
(45) Date of Patent: *Feb. 27, 2024

(54) MACHINE LEARNING ASSISTED IMAGE PREDICTION

(71) Applicant: Apple Inc., Cupertino, CA (US)

(72) Inventors: Carlos E. Guestrin, Seattle, WA (US); Leon A. Gatys, Mountain View, CA (US); Shreyas V. Joshi, Seattle, WA (US); Gustav M. Larsson, San Francisco, CA (US); Kory R. Watson, Seattle, WA (US); Srikrishna Sridhar, Seattle, WA (US); Karla P. Vega, Seattle, WA (US); Shawn R. Scully, Seattle, WA (US); Thorsten Gernoth, San Francisco, CA (US); Onur C Hamsici, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/860,030

(22) Filed: Jul. 7, 2022

(65) Prior Publication Data
US 2022/0414543 A1 Dec. 29, 2022

Related U.S. Application Data

(63) Continuation of application No. 16/706,578, filed on Dec. 6, 2019, now Pat. No. 11,386,355.
(Continued)

(51) Int. Cl.
*G06T 7/194* (2017.01)
*G06V 10/143* (2022.01)
(Continued)

(52) U.S. Cl.
CPC .......... *G06V 10/143* (2022.01); *G06N 20/00* (2019.01); *G06T 3/40* (2013.01); *G06T 7/194* (2017.01);
(Continued)

(58) Field of Classification Search
CPC . G06T 7/194; G06T 3/40; G06T 2207/10024; G06T 2207/20081
See application file for complete search history.

(56) References Cited

U.S. PATENT DOCUMENTS 11,386,355 B2 * 7/2022 Guestrin ................... G06T 3/40
2014/0307056 A1  10/2014 Collet
(Continued)

FOREIGN PATENT DOCUMENTS

CN 108154547 A 6/2018
CN 108345840 A 7/2018
(Continued)

OTHER PUBLICATIONS

Berg, et al., "Generating Visible Spectrum Images from Thermal Infrared," IEEE Conference on Computer Vision and Pattern Recognition Workshops, Jun. 2018, 10 pages.
(Continued)

*Primary Examiner* — Myron Wyche
(74) *Attorney, Agent, or Firm* — BAKERHOSTETLER (57) ABSTRACT

A device implementing a system for providing predicted RGB images includes at least one processor configured to obtain an infrared image of a subject, and to obtain a reference RGB image of the subject. The at least one processor is further configured to provide the infrared image and the reference RGB image to a machine learning model, the machine learning model having been trained to output predicted RGB images of subjects based on infrared images and reference RGB images of the subjects. The at least one
(Continued)

processor is further configured to provide a predicted RGB image of the subject based on output by the machine learning model.

23 Claims, 7 Drawing Sheets

Related U.S. Application Data (60) Provisional application No. 62/780,139, filed on Dec. 14, 2018.

(51) Int. Cl.
  *G06N 20/00* (2019.01)
  *G06T 3/40* (2006.01)
  *G06V 10/774* (2022.01)

(52) U.S. Cl.
  CPC .. *G06V 10/774* (2022.01); *G06T 2207/10024* (2013.01); *G06T 2207/10048* (2013.01); *G06T 2207/20081* (2013.01); *G06T 2207/20224* (2013.01); *G06T 2207/30201* (2013.01)

(56) References Cited

U.S. PATENT DOCUMENTS

| | | |
|---|---|---|
| 2015/0281593 A1 | 10/2015 | Slaby |
| 2016/0284095 A1 | 9/2016 | Chalom et al. |
| 2018/0097972 A1 | 4/2018 | Bourret |
| 2018/0336399 A1 | 11/2018 | Gernoth et al. |
| 2020/0129240 A1 | 4/2020 | Singh |

FOREIGN PATENT DOCUMENTS

| | | |
|---|---|---|
| CN | 108491805 A | 9/2018 |
| CN | 108491809 A | 9/2018 |
| CN | 108509892 A | 9/2018 |
| CN | 108564613 A | 9/2018 |
| FR | 2965269 A1 | 3/2012 |

OTHER PUBLICATIONS

Limmer, et al., "Infrared Colorization Using Deep Convolutional Neural Networks," Apr. 2016, retrieved from https://arxiv.org/pdf/1604.02245.pdf, 8 pages.
St Laurent, et al., "Combination of colour and thermal sensors for enhanced object detection," IEEE 10th International Conference on Information Fusion, Jul. 2007, 8 pages.
Zhang, et al., "TV-GAN: Generative Adversarial Network Based Thermal to Visible Face Recognition," IEEE International Conference on Biometrics, Feb. 2018, pp. 174-181.
Indian Office Action from Indian Patent Application No. 202117028719, dated Apr. 20, 2022, 7 pages.
International Search Report and Written Opinion from PCT/US2019/063755, dated Mar. 5, 2020, 15 pages.
Chinese Office Action from Chinese Patent Application No. 201980070345.5, dated Oct. 26, 2023, 15 pages including English language translation.

\* cited by examiner

MACHINE LEARNING ASSISTED IMAGE PREDICTION

CROSS REFERENCE TO RELATED APPLICATIONS

This application is a continuation of U.S. patent application Ser. No. 16/706,578, entitled "Machine Learning Assisted Image Prediction", filed Dec. 6, 2019, which claims the benefit of priority to U.S. Provisional Patent Application No. 62/780,139, entitled "Machine Learning Assisted Image Prediction," and filed on Dec. 14, 2018, the disclosure of each which is hereby incorporated herein in its entirety.

TECHNICAL FIELD

The present description relates generally to capturing and predicting red-green-blue (RGB) images, including using machine learning to produce predicted RGB images based on infrared images.

BACKGROUND

A user of an electronic device may use an image sensor (e.g., a camera) of the device to take pictures or videos, or to participate in audio-video conferencing with other participants using their respective devices. In some cases, environmental lighting conditions may affect image quality.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A user of an electronic device may use an image sensor (e.g., camera) of the device to take pictures or videos, or to participate in audio-video conferencing with other participants using their respective devices. In some cases, environmental lighting conditions may affect image quality. In environments with low lighting, image quality may be unsuitable for these uses. For example, details of a subject (e.g., a person's face) may be unclear in low-lit settings.

Moreover, even if the user's device were, in real-time, to edit captured RGB images using general image processing techniques (e.g., adjusting contrast, brightness and/or color values using preset values), the resulting RGB image may still lack the amount of detail (e.g., with respect to skin tone, skin texture, face shape) desired by users. Thus, it may be desirable to enhance image quality in cases where environmental lighting is low.

The subject system provides for using concurrently captured infrared image data and reference RGB data, in conjunction with one or more machine learning model(s) trained with infrared and RGB data, to output predicted RGB images. More specifically, the machine learning model may have been trained by a server, using infrared image data, reference RGB image data, and target (or expected) RGB image data spanning multiple subjects (e.g., people's faces). The reference RGB image data may be concurrent with the infrared image data (e.g., captured in low lighting) and/or may be captured prior to the infrared image data (e.g., captured in good lighting), and separate machine learning models may be generated and trained based on these two types of reference RGB image data. The server may provide the trained machine learning model(s) to devices, for local storage on the devices.

When a camera of a device is being used (e.g., a front facing camera is used for taking photos and/or for audio-video conferencing), the device may employ the machine learning model(s) to provide predicted RGB images (e.g., reconstructed RGB images with improved image quality). Moreover, the device may select which machine learning model to use in low lighting, based on an amount of environmental light. For example, in dim-lit environments where the light is not too low, RGB image data captured concurrent with the infrared image data can provided to a first machine learning model (e.g., that was trained with low-lit, concurrent RGB images) for predicting RGB images. If the light is too low, RGB image data captured prior to the infrared image in good lighting can be provided to a second machine learning model (e.g., that was trained with well-lit, prior RGB images) for predicting RGB images.

Figure 1:
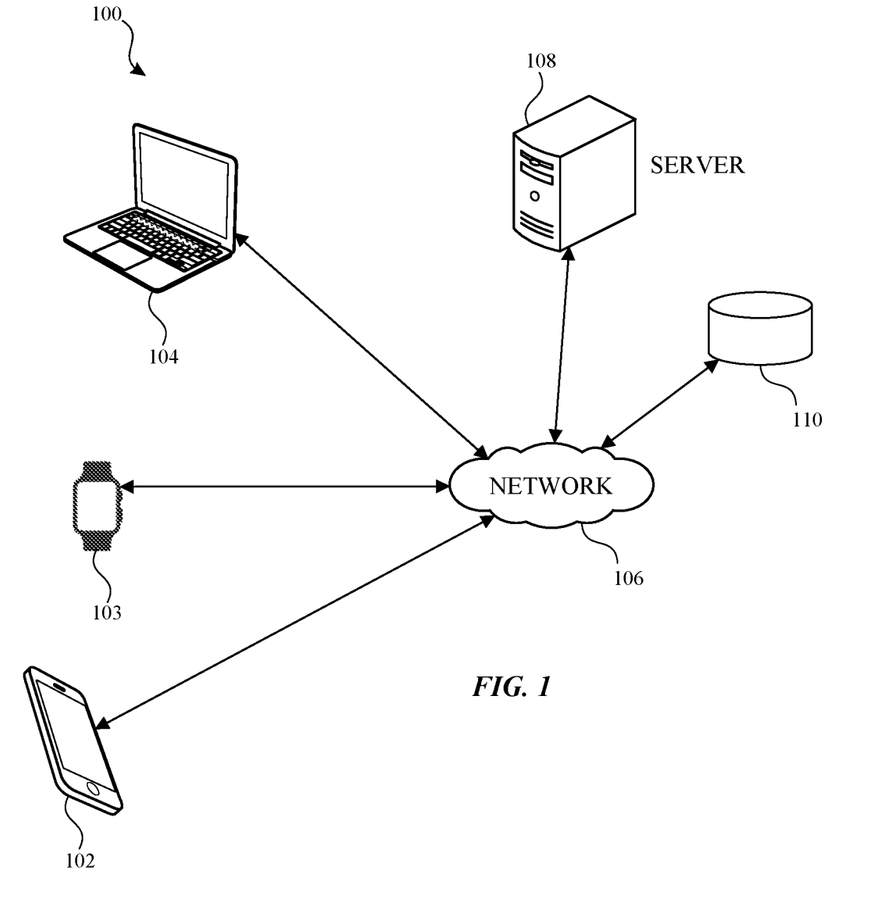
FIG. 1 illustrates an example network environment for using machine learning to predict RGB images in accordance with one or more implementations.

FIG. 1 illustrates an example network environment for using machine learning to predict RGB images in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103 and 104 (hereinafter 102-104), a network 106, a server 108, and an image training database 110. The network 106 may communicatively (directly or indirectly) couple, for example, any two or more of the electronic devices 102-104, the server 108, and/or the image training database 110. In one or more implementations, the network 106 may be an interconnected network of devices that may include, or may be communicatively coupled to, the Internet. For explanatory purposes, the network environment 100 is illustrated in FIG. 1 as including electronic devices 102-104, a single server 108 and a single image training database 110; however, the network environment 100 may include any number of electronic devices, any number of servers, and any number of image training databases.

One or more of the electronic devices 102-104 may be, for example, a portable computing device such as a laptop computer, a smartphone, a smart speaker, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a smartwatch and the electronic device 104 is depicted as a laptop computer. Each of the electronic devices 102-104 may be, and/or may include all or part of the electronic device discussed below with respect to FIG. 2, and/or the electronic system discussed below with respect to FIG. 7.

The server 108 may be, and/or may include all or part of, the electronic system discussed below with respect to FIG. 7. The server 108 may include one or more servers, such as a cloud of servers. For explanatory purposes, a single server 108 is shown and discussed with respect to various operations. However, these operations as discussed herein may be performed by one or more servers, and each different operation may be performed by the same or different servers. In addition, the image training database 110 is illustrated in FIG. 1 as separate from the server 108. However, all or part of the image training database 110 may instead be stored locally with respect to the server 108.

In one or more implementations, the server 108 that may be used to generate, train and/or update machine learning model(s) that are configured to provide predicted RGB images as output, based on received infrared and/or RGB image data. For example, the machine learning model(s) may be trained using infrared image data and/or reference RGB image data (e.g., captured concurrent with and/or prior to the infrared image data), as provided by one or more of the electronic devices 102-104 to the image training database 110.

As described herein, different interactions may occur between the electronic device(s) 102-104, the server 108 and the image training database 110. For example, one class of interactions may be the uploading of infrared image data and reference RGB data to the image training database 110, such that the server 108 may train and update the machine learning model(s) based on the uploaded image data. Another class of interactions may be the download of machine learning model(s) by the electronic devices 102-104. For example, these machine learning model(s) may be downloaded as part of a software update (e.g., of an operating system and/or of an application which uses the device camera), or as updated machine learning model(s) become available by the server 108.

Figure 2:
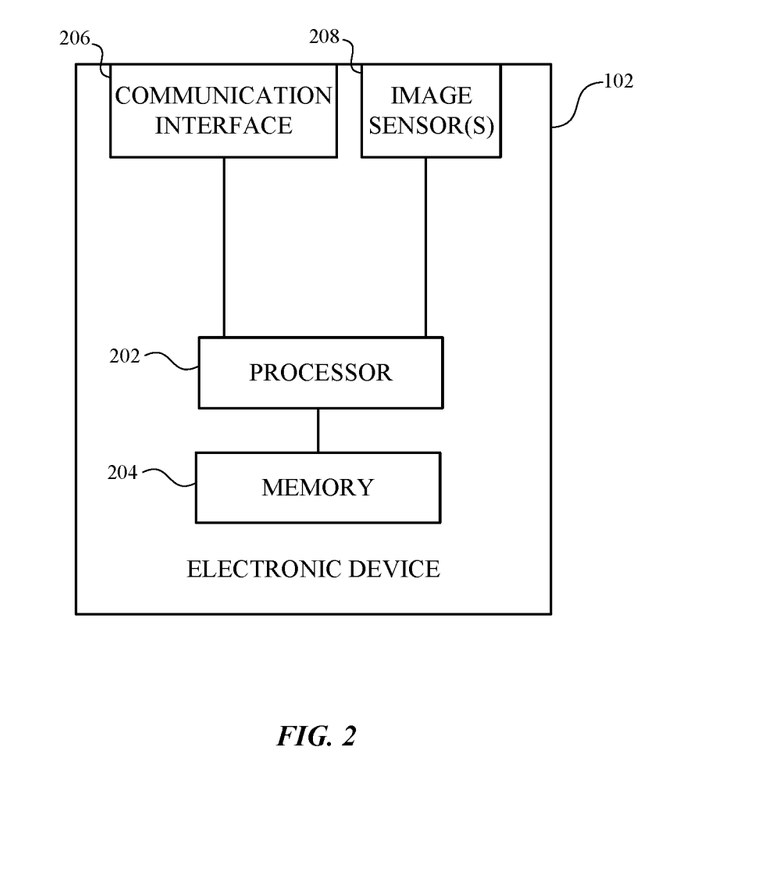
FIG. 2 illustrates an example electronic device that may implement the subject system for using machine learning to predict RGB images in accordance with one or more implementations.

FIG. 2 illustrates an example electronic device 102 that may implement the subject system for using machine learning to predict RGB images in accordance with one or more implementations. For explanatory purposes, FIG. 2 is primarily described herein with reference to the electronic device 102. However, FIG. 2 may correspond to any of the electronic devices 102-104 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, a communication interface 206, and one or more image sensor(s) 208. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 206 may include suitable logic, circuitry, and/or code that enables wired or wireless communication, such as between any of the electronic devices 102-104, the server 108 and/or the image training database 110. The communication interface 206 may include, for example, one or more of a Bluetooth communication interface, a cellular interface, an NFC interface, a Zigbee communication interface, a WLAN communication interface, a USB communication interface, or generally any communication interface.

The image sensor(s) 208 may be used to capture image data corresponding to a subject (e.g., a person's face). The image sensor(s) 208 may correspond to an RGB image sensor and/or an infrared image sensor. The image data captured by the image sensor(s) 208 may indicate color, depth, 2D and/or 3D characteristics of the subject. In one or more implementations, the electronic device 102 may further include an ambient light sensor (not shown) that can detect an amount of ambient light in a current environment of the electronic device 102.

In one or more implementations, one or more of the processor 202, the memory 204, the communication interface 206, the image sensor(s) 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
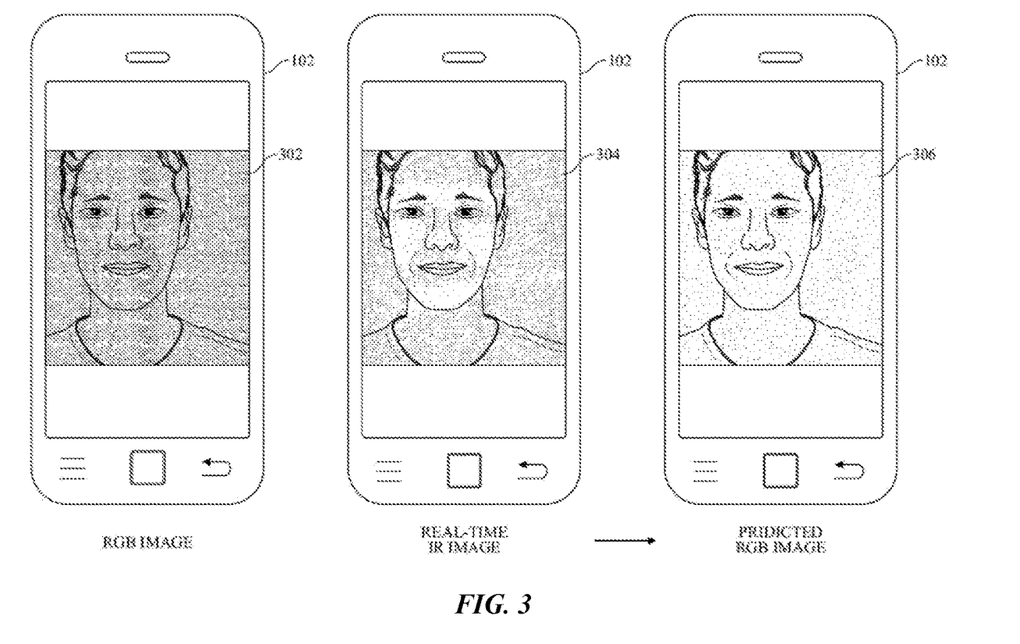
FIG. 3 illustrates an example of input images that may be used to produce predicted RGB output image in accordance with one or more implementations.

FIG. 3 illustrates an example of input images that may be used to produce predicted RGB output image in accordance with one or more implementations. For explanatory purposes, FIG. 3 is primarily described herein with reference to the electronic device 102. However, FIG. 3 may instead correspond to any of the electronic devices 103-104 of FIG. 1.

As noted above, image quality of a device camera (e.g., a front-facing camera) may vary based on environmental lighting conditions. In environments that are dimly-lit, image quality may degrade and be unsuitable for users. In the example of FIG. 3, the RGB image 302 corresponds with an RGB image captured by an RGB image sensor (e.g., one of the image sensor(s) 208) of the electronic device 102 in a low-light environment. As seen, the image quality of the RGB image 302 is relatively poor, as facial features of the subject are difficult to see; however, a semblance of the user is still visible within the RGB image 302.

FIG. 3 further illustrates an infrared image 304 captured concurrent with the RGB image 302. The infrared image 304 may have been captured by an infrared image sensor (e.g., one of the image sensor(s) 208) of the electronic device 102), in the same dimly-lit environment. Relative to the RGB image 302, the infrared image 304 has improved visibility with respect to facial features (e.g., eyes, nose, mouth). However, the infrared image 304 lacks color and may appear unnatural to users.

Moreover, FIG. 3 illustrates a predicted RGB image 306, which may correspond to output provided by a machine learning model as described herein. The machine learning model may have been trained to output predicted RGB images of subjects, based on infrared images and concurrently and/or previously captured reference RGB images of the subjects. Thus, with respect to the RGB image 302 and the captured infrared image 304, the machine learning model may be employed to generate the predicted RGB image 306. In one or more implementations, the image quality of the predicted RGB image 306 may be more desirable to users relative to the RGB image 302, the infrared image 304, and/or modified images (not shown) produced using general image processing techniques (e.g., adjusting contrast, brightness and/or color values based on preset values).

Figure 4:
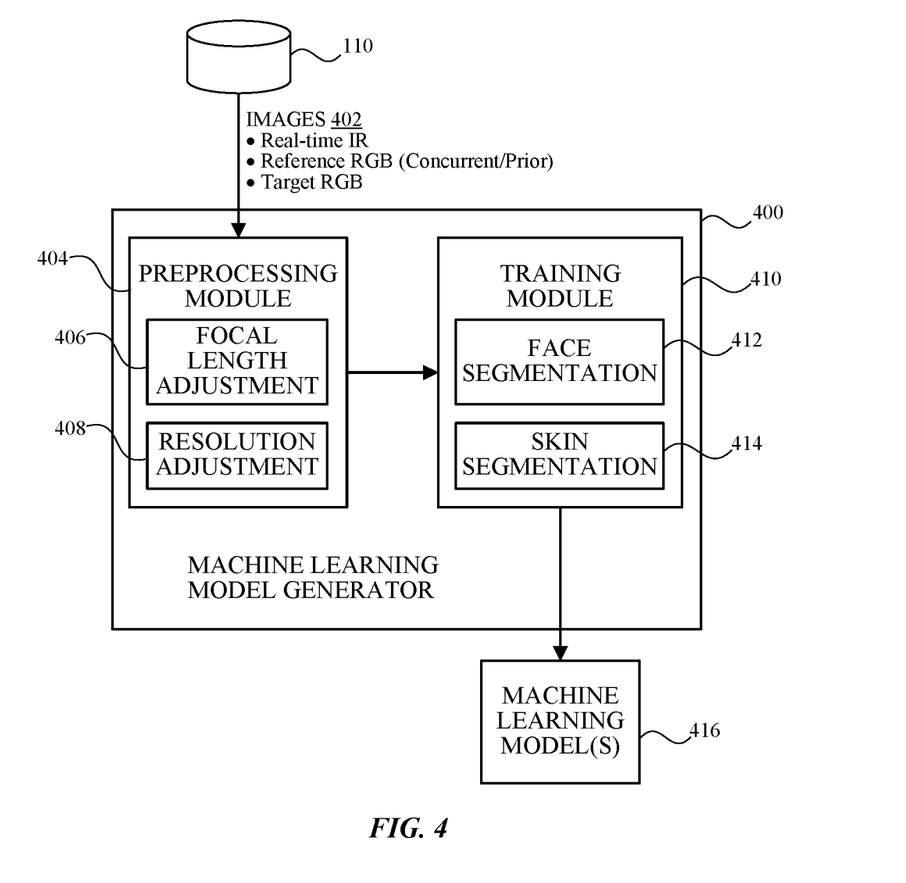
FIG. 4 illustrates an example of a machine learning model generator in accordance with one or more implementations.

FIG. 4 illustrates an example of a machine learning model generator 400 in accordance with one or more implementations. For explanatory purposes, FIG. 4 is primarily described herein with reference to the server 108 and the electronic device 102 (e.g., although any of the electronic devices 102-104 may apply). In one or more implementations, the machine learning model generator 400 can be implemented by one or more software modules running on a processor(s) of the server 108 and/or any other device. In another example, the machine learning model generator 400 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 4, the machine learning model generator 400 takes images 402 from the image training database 110 as input, in order to generate, train and/or update one or more machine learning model(s) 416. In one or more implementations, the machine learning model generator 400 includes a preprocessing module 404, which in turn includes a focal length adjustment component 406 and a resolution adjustment component 408. However, the preprocessing module 404 may generally include any image processing components. The machine learning model generator 400 further includes a training module 410, which in turn includes a face segmentation component 412 and a skin segmentation component 414.

In one or more implementations, the image training database 110 corresponds to a database of images uploaded by multiple electronic devices (e.g., any of electronic devices 102-104), and/or received from any other source, such as a repository of images. For example, in uploading training image(s) 402 for a subject, the electronic device 102 may capture a real-time infrared image (e.g., as captured by an infrared image sensor), a reference RGB image (e.g., obtained concurrent with and/or prior to the infrared image data), and a target RGB image (e.g., as captured by an RGB image sensor).

The type of reference RGB image uploaded to the image training database 110 may differ depending on which type of machine learning model is being trained. For example, a prior reference RGB image (e.g., which is not concurrent with a real-time infrared image) may be uploaded when training a "conditioning" machine learning model, which may correspond with fine tuning video (e.g., for audio-video conferencing) and/or single frame images (e.g., for photos). The reference RGB image may be captured by an RGB image sensor of the electronic device 102. The reference RGB image may be a well-lit image, for example, as captured in a well-lit environment and/or using a device-provided flash. In one example, the reference RGB image may be a video frame that is a preset number of frames prior to a current infrared image (e.g., 5 frames prior). In another example, the reference RGB image may be a well-lit image of the person's face that was captured in a session separate from the current image capture session (e.g., an image of the user's face selected from a photo library of the electronic device 102, using facial recognition techniques).

Further, for the conditioning machine learning model, the target image RGB image may be an RGB image that is well-lit and concurrent with the real-time infrared image of the subject (e.g., the person's face). Thus, the conditioning machine learning model may be trained using a real-time infrared image and a well-lit RGB reference image that is prior to the real-time infrared image, together with a well-lit, RGB image concurrent with the infrared image as the target (or expected) output.

Another type of machine learning model is a "de-noising" machine learning model, which may correspond with low light simulation. An RGB image (e.g., concurrent with the real-time infrared image) may be uploaded for training the de-noising machine learning model. The concurrent RGB image may be captured by an RGB image sensor of the electronic device 102 in low-lit conditions.

In addition, for the de-noising machine learning model, the target RGB image may be a well-lit image of the subject. For example, the target RGB image may be captured by temporarily changing the low-lit environment (e.g., corresponding to the RGB image that is concurrent with the infrared image) to a well-lit environment, for example, by temporarily turning on the lights and/or using a device-provided flash. Thus, the de-noising machine learning model may be trained using a real-time infrared image and a low-lit, reference RGB image, together with a well-lit RGB image as the target (or expected) output. In one or more implementations, when a user takes a picture in a low-light environment with a flash, the user's device may capture a low-light image (e.g., a reference image) immediately prior to the flash being triggered, and then may capture an IR image and a well-lit image (e.g., a target image) when the flash has lit up the user's face.

The uploading of real-time infrared image data, the reference RGB data and the target RGB data to the image training database 110 may correspond with a coordinated and staged process, in which participants who have opted-in have their images (e.g., faces) captured. For example, the participants may physically sit in for their pictures within a staged setting (e.g., for capturing well-lit and/or low-lit images) as part of a photo session. The images may be uploaded to the server 108 after the photo session.

Alternatively or in addition, the participants may take their own pictures (e.g., selfies) based on guidelines provided to the participants, and/or the participants devices' may automatically capture a low-lit image, a well-lit image, and an IR image whenever the participant's take their own image in low-light conditions with a flash. In such a case, the uploading of images 402 to the image training database 110 may occur periodically, based on predefined settings on the electronic device 102. For example, the uploading may occur when the electronic device 102 is plugged in at night (e.g., a time during which power may not be a concern), and/or when the electronic device 12 is connected to the network 106 (e.g., paired with a Wi-Fi base station).

In one or more implementations, the preprocessing module 404 is an optional module used to prepare the images 402 before they are provided to the training module 410. For example, the focal length adjustment component 406 may be used to compensate for different positions of an infrared image sensor and an RGB image sensor on the electronic device 102. The different positions may cause a real-time infrared image, a reference RGB image and/or a target RGB image to be misaligned with respect to focal length. Thus, the focal length adjustment component 406 may be configured to adjust one or more of the real-time infrared image, the reference RGB image and the target RGB image so as to align more closely with one another.

In addition, the resolution adjustment component 408 may be used to compensate for differences in image resolution between the infrared image, the reference RGB image and the target RGB image so as to correspond more closely with one another. For example, the resolution adjustment component 408 may be configured to up-convert or down-convert one or more of the images so that the respective resolutions match.

As noted above, the preprocessing module 404 is an optional module which may assist in expedited training of the machine learning model(s) 416. For example, by more closely aligning the images 402 with respect to focal length and/or changing image resolutions to more closely match, the training of the machine learning model(s) 416 may be facilitated. However, it is possible for the machine learning model(s) 416 to be trained with the original, unchanged images 402. For example, by virtue of being trained with multiple images and subjects (e.g., thousands of subjects), the machine learning model(s) 416 may automatically account for differences in alignment with respect to focal length and/or resolution.

In one or more implementations, the training module 410 is configured to receive the real-time infrared image data, the reference RGB data and the target RGB data (e.g., corresponding to multiple subjects), and generate the machine learning model(s) 416. The face segmentation component 412 may be configured to determine facial characteristics with respect to the provided images 402. The facial characteristics may include, but are not limited to, a general shape and size of the face, a position of facial features (e.g., eyes, nose, moth, ears and the like), and/or a shape of the facial features. For example, shape, position and size of facial features may be determined from the real-time infrared image data (e.g., which can relate to depth of objects), the reference RGB data and/or the target RGB data (e.g., expected output) provided to the training module 410.

Moreover, the skin segmentation component 414 may be configured to determine skin characteristics with respect to the provided images 402. The skin characteristics may include, but are not limited to, skin tone and skin texture for the various facial features. For example, skin tone and skin texture may be determined from the real-time infrared image data, the reference RGB data and the target RGB data (e.g., expected output) provided to the training module 410.

Based on the facial characteristics as determined by the face segmentation component 412 and/or the skin characteristics as determined by the skin segmentation component 414, the training module may generate and train one or more machine learning model(s) 416. Thus, the machine learning model(s) 416 may be trained so as to output predicted RGB images with enhanced image quality (e.g., color representations of the infrared images with more accurate and natural facial and/or skin characteristics). As noted above, the machine learning model(s) 416 may include a conditioning machine learning model (e.g., trained with well-lit, RGB images captured prior to associated IR images) and a de-noising machine learning model (e.g., trained with low-lit, RGB images captured concurrently with associated IR images), which will be discussed below in greater detail with respect to FIG. 5.

In one or more implementations, one or more of the machine learning model generator 400, the preprocessing module 404, focal length adjustment component 406, the resolution adjustment component 408, the training module 410, the face segmentation component 412, the skin segmentation component 414 and the machine learning model (s) 416 are implemented as software instructions, stored in memory, which when executed by a processor(s) of the server 108, cause the processor(s) to perform particular function(s).

In one or more implementations, one or more of the machine learning model generator 400, the preprocessing module 404, focal length adjustment component 406, the resolution adjustment component 408, the training module 410, the face segmentation component 412, the skin segmentation component 414 and the machine learning model (s) 416 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
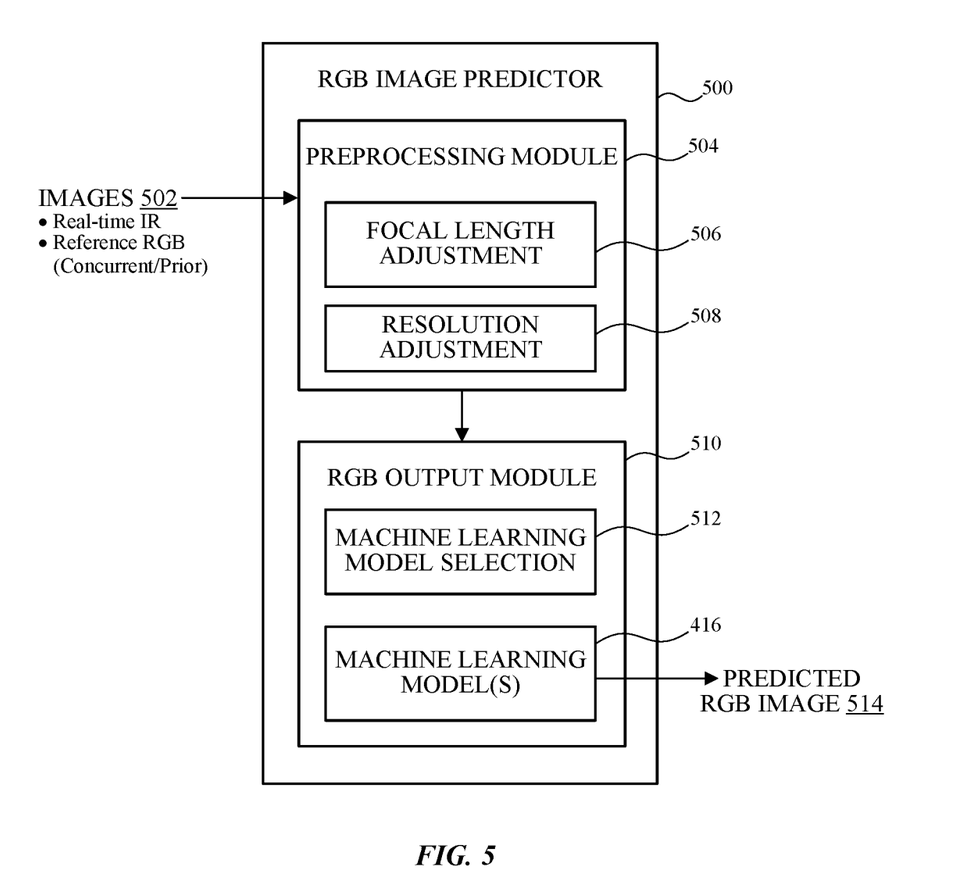
FIG. 5 illustrates an example of an RGB image predictor which uses machine learning model(s) to predict RGB images in accordance with one or more implementations.

FIG. 5 illustrates an example of an RGB image predictor 500 which uses machine learning model(s) 416 to predict RGB images in accordance with one or more implementations. For example, RGB image predictor 500 can be implemented by one or more software modules running on the processor 202 of the electronic device 102 and/or any other device (e.g., any of the electronic devices 103-104). In another example, RGB image predictor 500 can be implemented by custom hardware (e.g., one or more coprocessors)

configured to execute the functionality of RGB image predictor 500. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 5, the RGB image predictor 500 takes images 502 (e.g., as captured by image sensor(s) 208 of the electronic device 102) as input, and outputs predicted RGB images 514. In one or more implementations, the RGB image predictor 500 includes a preprocessing module 504, which in turn includes a focal length adjustment component 506 and a resolution adjustment component 508. The RGB image predictor 500 further includes an RGB output module 510, which in turn includes a machine learning model selection component 512 and the machine learning model(s) 416.

As noted above, the electronic device 102 may download the machine learning model(s) 416 from the server 108 via the network 106. The machine learning model(s) may be downloaded by the electronic device 102 as part of a software update (e.g., of an operating system and/or of an application which uses the device camera), or as updated machine learning model(s) become available by the server 108.

In one or more implementations, the images 502 correspond to real-time infrared image data and reference RGB data concurrently obtained on the electronic device 102. For example, the user may be participating in audio-video conferencing, or may be taking photographs (e.g., selfies), using a front facing camera of the device. In some cases, the environmental lighting may be low, such that enhanced RGB output of the camera is desirable. Thus, the reference RGB data may correspond to concurrent RGB data captured in low-lit conditions. If the environmental lighting is too low (e.g., ambient lighting is below a predefined lux threshold as detected by an ambient light sensor), it may be more suitable for the reference RGB data to correspond with well-lit RGB data captured prior to the infrared image data (e.g., a prior image in the photo library).

In one or more implementations, the preprocessing module 504 may be similar to the preprocessing module 404 discussed above with respect to FIG. 4. For example, the preprocessing module 504 may be an optional module for expedited processing by the machine learning model(s) 416. The focal length adjustment component 506 may align the images 502 with respect to focal length, and the resolution adjustment component 508 may change resolutions of the images 502 to more closely match. Presuming that the machine learning model(s) 416 were trained with the preprocessed images 402 (e.g., as provided by the preprocessing module 404 in FIG. 4), the data provided to the RGB output module 510 may also be preprocessed (e.g., by the preprocessing module 504), which may facilitate in generating predicted RGB images 514. However, it is also possible for the machine learning model(s) 416 to generate the predicted RGB images 514 without using the preprocessing module 504.

In one or more implementations, background subtraction may be performed with respect to the images 502 (e.g., the infrared image data and/or the reference RGB data). Thus, background imagery may be removed and replaced with a solid color (e.g., black, white, or a user-selected color), so that only the subject (e.g., the person's face) remains in the image. The background subtraction may be performed by the preprocessing module 405, or may be performed by the RGB image predictor 500 prior to the preprocessing performed by preprocessing module 405.

In one or more implementations, the RGB output module 510 is configured to generate the predicted RGB images 514, based on output from the machine learning model(s) 416. As noted above, the machine learning model(s) may include at least a de-noising machine learning model and a conditioning machine learning model. In this regard, the machine learning model selection component 512 may be configured to select which of the machine learning model(s) 416 will be used to generate the predicted RGB images 514.

The de-noising machine learning model (e.g., trained with low-lit, RGB images captured concurrently with corresponding IR images) may provide for enhanced RGB images in environments with low lighting. However, in a case where environmental lighting is too low (e.g., below a threshold lux value for incoming RGB images), the RGB image data may not provide sufficient data to enhance the real-time RGB image. As such, the conditioning machine learning model (e.g., trained with well-lit, RGB images captured prior to associated IR images) may instead be used to provide for enhanced RGB images in environments where lighting is too low (e.g., below the threshold lux value).

Thus, the machine learning model selection component 512 may determine an amount of environmental lighting. If the amount of ambient light is below the threshold lux value, the machine learning model selection component 512 may select the conditioning machine learning model to generate the predicted RGB images 514. Otherwise, the machine learning model selection component 512 may select the de-noising machine learning model to generate the predicted RGB images 514. The machine learning model selection component 512 may continuously or periodically monitor the amount of light (e.g., based at least partially on an ambient light sensor) as new images 502 are provided, and may switch between the de-noising machine learning model and the conditioning machine learning model accordingly.

As noted above, the machine learning model(s) 416 may have been trained at least partially based on the face segmentation component 412 and the skin segmentation component 414. As such, the machine learning model(s) 416 may be configured to generate the predicted RGB images 514 based on facial characteristics associated with at least one of facial segmentation or skin segmentation. For example, the machine learning model(s) 416 may be configured to receive facial and/or skin segmentation data as input, to generate the RGB images 514 accordingly.

In case of well-lit environments, in which an amount of ambient light is above a second threshold lux value (e.g., based on incoming RGB data concurrent with the infrared image data), it may not be necessary to use the machine learning model(s) 416 to output the predicted RGB images 514. Thus, the RGB image predictor 500 may be configured to continuously or periodically monitor the amount of light (e.g., based at least partially on an ambient light sensor) as new images 502 are provided, in deciding whether or not to generate the predicted RGB images 514 (e.g., and bypass the use of the machine learning model(s) 416).

In one or more implementations, one of more of the RGB image predictor 500, the preprocessing module 504, the focal length adjustment component 506, the resolution adjustment component 508, the RGB output module 510, the machine learning model selection component 512 and the machine learning model(s) 416, are implemented as software instructions, stored in the memory 204, which when executed by the processor 202, cause the processor 202 to perform particular function(s).

In one or more implementations, one or more of the RGB image predictor 500, the preprocessing module 504, the focal length adjustment component 506, the resolution adjustment component 508, the RGB output module 510, the machine learning model selection component 512, and the machine learning model(s) 416 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6:
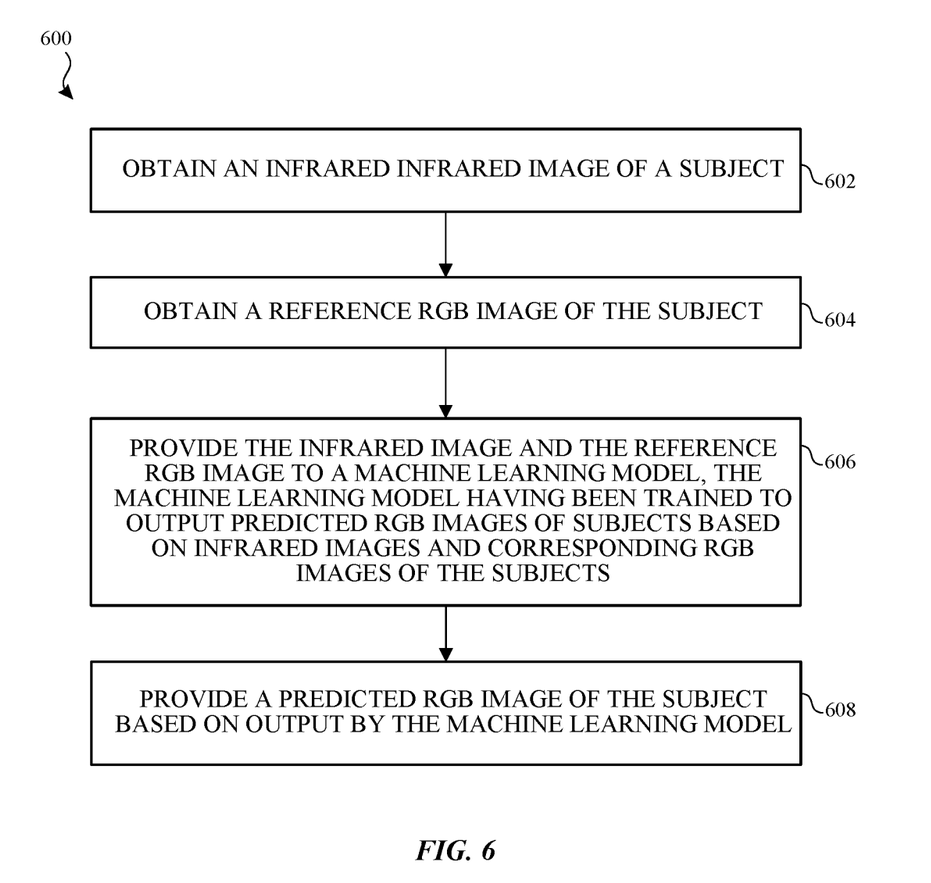
FIG. 6 illustrates a flow diagram of an example process for using machine learning to predict RGB images in accordance with one or more implementations.

FIG. 6 illustrates a flow diagram of an example process 600 using machine learning to predict RGB images in accordance with one or more implementations. For explanatory purposes, the process 600 is primarily described herein with reference to the electronic device 102 of FIG. 1. However, the process 600 is not limited to the electronic device 102, and one or more blocks (or operations) of the process 600 may be performed by one or more other components and other suitable devices (e.g., any of the electronic devices 103-104). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 102 obtains an infrared image of a subject (602). The electronic device 102 obtains a reference RGB image of the subject (604). The reference RGB image of the subject may be obtained by an RGB image sensor concurrent with capturing the IR image. Alternatively, or in addition, the reference RGB image of the subject may be an RGB image of the subject captured prior to capturing the IR image (e.g., from a photo library, or a preset number of frames prior to the current frame).

The electronic device 102 provides the infrared image and the reference RGB image to a machine learning model, the machine learning model having been trained to output predicted RGB images of subjects based on infrared images and corresponding RGB images of the subjects (606). The electronic device 102 may perform background subtraction with respect to the subject prior to providing the infrared image and the reference RGB image to the machine learning model.

The electronic device 102 may perform focal length adjustment on at least one of the infrared image or the reference RGB image prior to providing the infrared image and the reference RGB image to the machine learning model. Alternatively or in addition, the electronic device 102 may perform resolution adjustment on at least one of the infrared image or the reference RGB image prior to providing the infrared image and the reference RGB image to the machine learning model.

The machine learning model may have been further trained based on target RGB images which are obtained concurrent with a corresponding IR/RGB image pair and which are captured in an environment having an ambient light level above a predefined lux level (e.g., corresponding to good lighting). In one or more implementations, the machine learning model may be configured to receive estimated facial characteristics corresponding to at least one of facial segmentation or skin segmentation, and the output of the machine learning model may be based at least partially on the estimated facial characteristics.

In one or more implementations, the electronic device 102 may select the machine learning model to use for the RGB image prediction from plural machine learning models, based on a lux level of a current environment of the user. The machine learning models may have been trained to predict RGB images for differing levels of ambient light.

The electronic device 102 provides a predicted RGB image of the subject based on output by the machine learning model (608). The predicted RGB image may correspond to a color representation of the infrared image.

As described above, one aspect of the present technology is the gathering and use of data available from specific and legitimate sources to generate and/or capture RGB images and IR images. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to generate RGB images. Accordingly, use of such personal information data may improve image quality. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of generating RGB images, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 7:
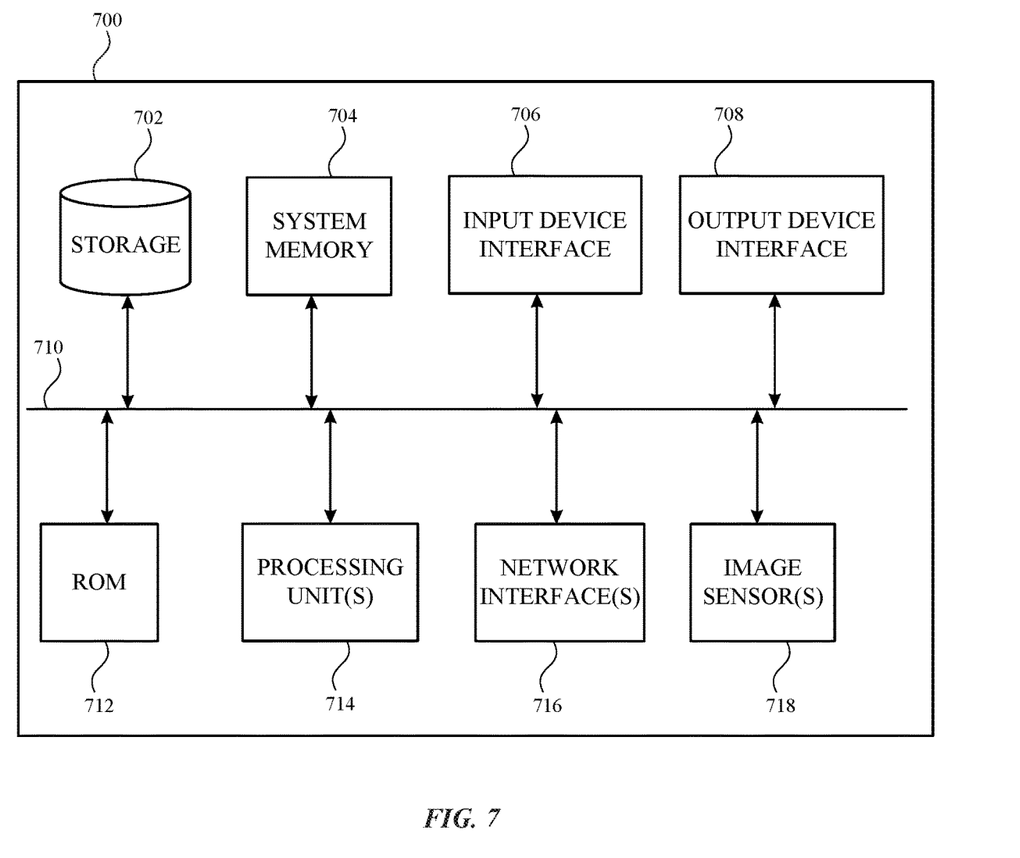
FIG. 7 illustrates an example electronic system with which aspects of the subject technology may be implemented in accordance with one or more implementations.

FIG. 7 illustrates an example electronic system with which aspects of the subject technology may be implemented in accordance with one or more implementations. The electronic system 700 can be, and/or can be a part of, any electronic device or server for generating the features and processes described in reference to FIGS. 1-2, including but not limited to a laptop computer, tablet computer, smartphone, and wearable device (e.g., smartwatch, fitness band). The electronic system 700 may include various types of computer readable media and interfaces for various other types of computer readable media. The electronic system 700 includes a permanent storage device 702, a system memory 704 (and/or buffer), an input device interface 706, an output device interface 708, a bus 710, a ROM 712, one or more processing unit(s) 714, one or more network interface(s) 716, image sensor(s) 718, and/or subsets and variations thereof.

The bus 710 collectively represents all system, peripheral, and chipset buses that communicatively connect the numerous internal devices of the electronic system 700. In one or more implementations, the bus 710 communicatively connects the one or more processing unit(s) 714 with the ROM 712, the system memory 704, and the permanent storage device 702. From these various memory units, the one or more processing unit(s) 714 retrieves instructions to execute and data to process in order to execute the processes of the subject disclosure. The one or more processing unit(s) 714 can be a single processor or a multi-core processor in different implementations.

The ROM 712 stores static data and instructions that are needed by the one or more processing unit(s) 714 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 714 may need at runtime. In one or more implementations, the processes of the subject disclosure are stored in the system memory 704, the permanent storage device 702, and/or the ROM 712. From these various memory units, the one or more processing unit(s) 714 retrieves instructions to execute and data to process in order to execute the processes of one or more implementations.

The bus 710 also connects to the input and output device interfaces 706 and 708. The input device interface 706 enables a user to communicate information and select commands to the electronic system 700. Input devices that may be used with the input device interface 706 may include, for example, alphanumeric keyboards and pointing devices (also called "cursor control devices"). The output device interface 708 may enable, for example, the display of images generated by electronic system 700. Output devices that may be used with the output device interface 708 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 710 also connects to the image sensor(s) 718. In one or more implementations, the image sensor(s) 718 may be utilized to capture image data, including but not limited to RGB image data or infrared image data.

Finally, as shown in FIG. 7, the bus 710 also couples the electronic system 700 to one or more networks and/or to one or more network nodes through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   capturing, by a device, a first type of image of a subject;
   obtaining, by the device, a second type of image of the subject;
   providing, by the device, the first type of image and the second type of image as inputs to a machine learning model, the machine learning model having been trained to output predicted images of subjects based on the first type of images and corresponding second type of images of the subjects; and
   providing, by the device, a predicted image of the subject based on output by the machine learning model.

2. The method of claim 1, wherein the second type of image of the subject is captured by an RGB image sensor concurrent with capturing the first type of image by another sensor.

3. The method of claim 1, wherein the second type of image of the subject is an RGB image of the subject captured prior to capturing the first type of image.

4. The method of claim 1, wherein the first type of image comprises an infrared image and the predicted image corresponds to a color representation of the infrared image.

5. The method of claim 1, further comprising:
   selecting, by the device, the machine learning model from plural machine learning models based on an ambient lux level.

6. The method of claim 5, wherein the selected machine learning model has been trained based on concurrently captured first and second type of images of corresponding subjects.

7. The method of claim 6, wherein a lux level of an environment in which the second type of images were captured is below a predefined lux level.

8. The method of claim 5, wherein the selected machine learning model has been trained based on first type of images and corresponding second type of images captured prior to the first type of images.

9. The method of claim 8, wherein a lux level of an environment in which the corresponding second type of images were captured is above a predefined lux level.

10. The method of claim 1, wherein the machine learning model has been further trained based on target second type of images which were captured concurrently with capturing corresponding first type of images in an environment having a lux level above a predefined lux level.

11. The method of claim 1, wherein the machine learning model is configured to receive estimated facial characteristics corresponding to at least one of facial segmentation or skin segmentation, and
   wherein the output of the machine learning model is based at least partially on the estimated facial characteristics.

12. The method of claim 1, further comprising:
   performing background subtraction with respect to the subject prior to providing the first and second types of images to the machine learning model.

13. The method of claim 1, further comprising:
   performing focal length adjustment on at least one of the first or second type of image prior to providing the first and second type of images to the machine learning model, wherein the focal length adjustment is based at least in part on a first position of a first sensor that captures the first type of images and a second position of a second sensor that captures the second type of images.

14. The method of claim 1, further comprising:
   performing resolution adjustment on at least one of the first or second type of images prior to providing the first and second type of images to the machine learning model, wherein the resolution adjustment compensates for differences in resolution between the first and second type of images.

15. A device, comprising:
   an infrared image sensor;
   at least one processor; and
   a memory including instructions that, when executed by the at least one processor, cause the at least one processor to:
      capture, by the infrared image sensor, an infrared image;
      obtain an RGB image corresponding to the infrared image;
      provide the infrared image and the RGB image to a machine learning model, the machine learning model having been trained to output predicted RGB images based on infrared images and corresponding RGB images; and
      provide a predicted RGB image based on an output of the machine learning model.

16. The device of claim 15, further comprising:
   an RGB image sensor configured to capture the RGB image concurrently with the infrared image being captured by the infrared image sensor.

17. The device of claim 15, wherein the RGB image is captured prior to the infrared image.

18. The device of claim 15, wherein the predicted RGB image corresponds to a color representation of the infrared image.

19. The device of claim 15, wherein the instructions further cause the at least one processor to:
- select the machine learning model from plural machine learning models based on an ambient lux level,
- wherein the selected machine learning model has been trained based on concurrently captured infrared and RGB images of corresponding subjects, or
- wherein the selected machine learning model has been trained based on infrared images and corresponding RGB images captured prior to the infrared images.

20. A non-transitory computer-readable medium comprising instructions which, when executed by one or more processors, cause the one or more processors to:
- obtain a first type of image;
- obtain a second type of image that corresponds to the first type of image;
- select a machine learning model from plural machine learning models based on an ambient lux level;
- provide the first and second type of images to the selected machine learning model, the selected machine learning model having been trained to output predicted color images based on first type of images and corresponding second type of images; and
- provide a predicted color image based on an output of the selected machine learning model.

21. The method of claim 1, wherein providing, by the device, the predicted image of the subject based on output by the machine learning model comprises:
- displaying, on a display of the device, the predicted image of the subject.

22. The method of claim 21, wherein the first type of image of the subject corresponds to a low-lit environment and the predicted image of the subject corresponds to a well-lit environment.

23. The method of claim 22, wherein at least a portion of the subject is more clear in the predicted image than in the first type of image.

* * * * *

UNITED STATES PATENT AND TRADEMARK OFFICE
CERTIFICATE OF CORRECTION

| | | |
|---|---|---|
| PATENT NO. | : 11,915,460 B2 | Page 1 of 1 |
| APPLICATION NO. | : 17/860030 | |
| DATED | : February 27, 2024 | |
| INVENTOR(S) | : Carlos E. Guestrin et al. | |

It is certified that error appears in the above-identified patent and that said Letters Patent is hereby corrected as shown below:

On the Title Page

Under Item (72) Inventors; (10th Inventor): "Onur C Hamsici, Cupertino, CA" should read --Onur C. Hamsici, Cupertino, CA--.

Signed and Sealed this
Thirtieth Day of April, 2024

Katherine Kelly Vidal
*Director of the United States Patent and Trademark Office*